United States Patent [19]

Flagg et al.

[11] 4,073,497
[45] Feb. 14, 1978

[54] CARE CHUCK STOP ASSEMBLY

[75] Inventors: Richard Edward Flagg, East Bridgewater; Blaine Potter, Sharon, both of Mass.

[73] Assignee: Double E Company, Inc., Brockton, Mass.

[21] Appl. No.: 710,904

[22] Filed: Aug. 2, 1976

[51] Int. Cl.$^2$ .................... B23B 31/40; B65H 17/02
[52] U.S. Cl. .................... 279/2 R; 242/68.2; 242/72.1
[58] Field of Search .................... 279/2 R, 2 A, 35; 242/68, 68.2, 72 R, 72.1, 68.3

[56] References Cited

U.S. PATENT DOCUMENTS

| | | | |
|---|---|---|---|
| 3,275,255 | 9/1966 | Pitts | 242/68.3 |
| 3,355,121 | 11/1967 | Wright | 242/68.2 |
| 3,432,112 | 3/1969 | Hardy | 242/68.2 |
| 3,993,317 | 11/1976 | Flagg | 242/68.2 X |

FOREIGN PATENT DOCUMENTS 605,846  9/1960  Canada .................... 242/68.2

Primary Examiner—Othell M. Simpson
Assistant Examiner—W. D. Bray

[57] ABSTRACT

A stop assembly comprising a generally cylindrical body whose outer surface is adapted for engaging the interior cylindrical surface of a hollow core, a plurality of fingers secured to the body for pivotal movement about axes generally parallel to that of the core between first positions in which the fingers lie radially within the outer surface of the body and second positions in which the fingers project beyond the outer surface for engaging an end surface of the core, each of the fingers having a core engagement surface lying in a plane generally perpendicular to the outer surface of the body and adapted for engaging the core end surface and a generally oppositely-facing camming surface inclined relative to the core engagement surface, the fingers being biased outwardly and no fixed portion of the assembly lying radially outwardly of the outer surface so that the entire assembly may be inserted into and through a core having an interior cylindrical surface of diameter not substantially greater than that of the diameter of the outer surface.

14 Claims, 5 Drawing Figures

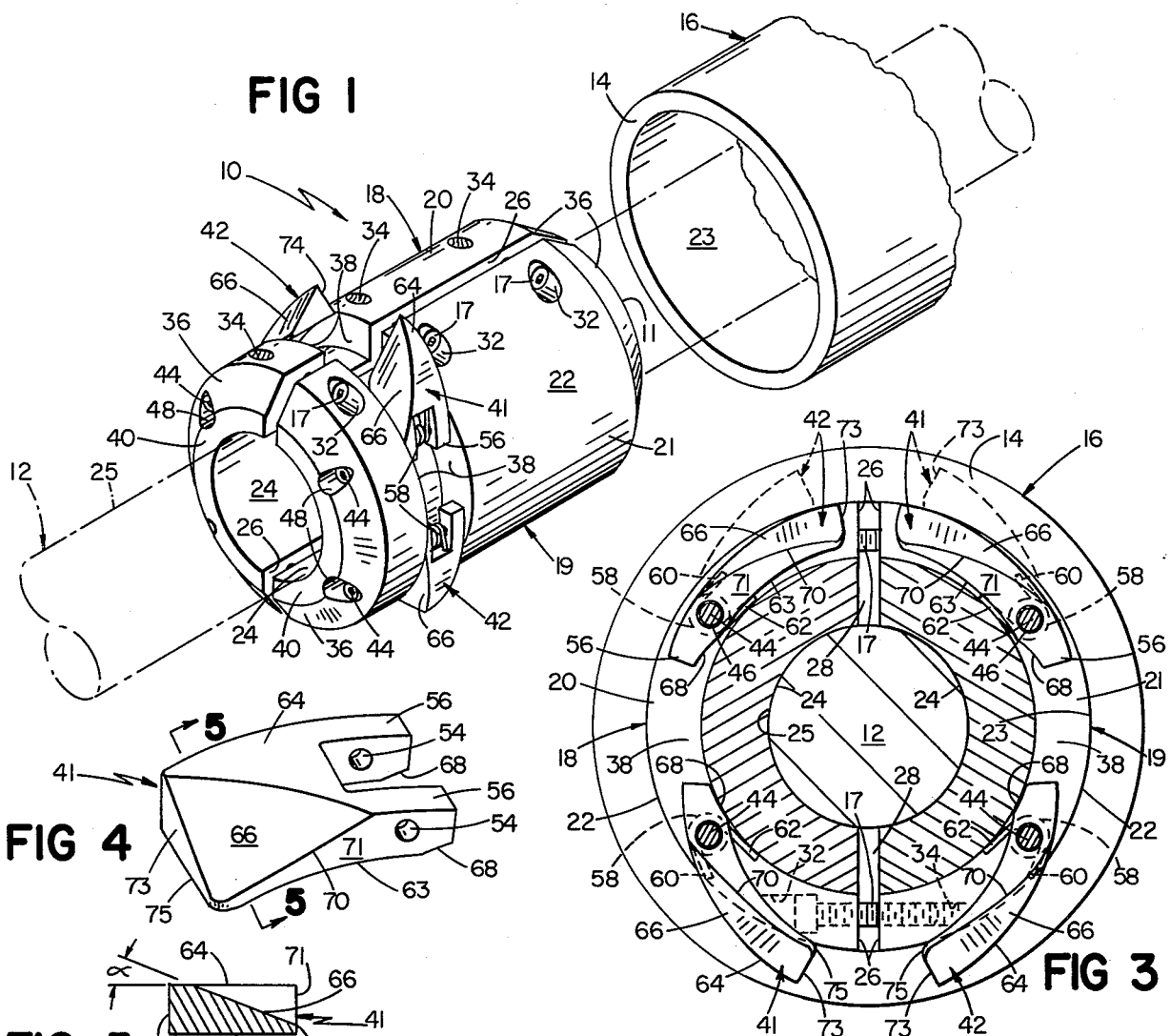

CARE CHUCK STOP ASSEMBLY

This invention relates to supporting hollow cores on shafts.

In many manufacturing and processing operations, web material is wrapped around a hollow core and the core is supported on a shaft extending therethrough. It is important that the core be fixed axially relative to the shaft, and is desirable that as little time and manpower as possible be required to mount successive cores on and remove them from the shaft.

In practice, the ends of the shaft are usually supported by core chucks, typically of the general type shown in U.S. Pat. Nos. 3,355,121; 3,432,112; and 3,792,868. Such chucks expand to engage the inner cylindrical surface of the core and fix the core against relative circumferential movement about the shaft. Relative axial movement between the core and shaft is prevented by flanges or stops engaging the opposite axial ends of the core. Generally, at least one of the flanges (which may be part of the complete chuck assembly) must be mounted on the shaft after the shaft has been inserted into the core. Attempts have been made to provide collapsible flanges or stops which may be pushed through a core after mounting on the shaft, but these have proved less than fully satisfactory. In particular, they have not provided axially-facing stop surfaces that are of sufficient size, essentially coplanar and perpendicular to the shaft axis.

It is a principal object of the present invention to provide a stop assembly that may be fixed in position on a shaft and then inserted through a core to engage the far end of the core, and that provides axial stop surfaces of the necessary size and orientation. Other objects include providing such devices which are inexpensive, simple to use either per se or as part of a core chuck, unlikely to malfunction, usable with reversible shafts, and non-destructive of the core.

The invention features a stop assembly comprising a generally cylindrical body whose outer surface is adapted for engaging the interior cylindrical surface of a hollow core, a plurality of fingers secured to the body for pivotal movement about axes generally parallel to that of the core between first positions in which the fingers lie radially within the outer surface of the body and second positions in which the fingers project beyond the outer surface for engaging an end surface of the core, each of the fingers having a core engagement surface lying in a plane generally perpendicular to the outer surface of the body and adapted for engaging the core end surface and a generally oppositely-facing camming surface inclined relative to the core engagement surface, the fingers being biased outwardly and no fixed portion of the assembly lying radially outwardly of the outer surface so that the entire assembly may be inserted into and through a core having an interior cylindrical surface of diameter not substantially greater than that of the diameter of the outer surface. In preferred embodiments in which the assembly comprises a pair of identical collar halves, the fingers are mounted in an annular groove in the outer surface, the camming surfaces are generally triangular in shape and are inclined at an angle of less than 30°, preferably not more than about 20°, relative to the axes of pivotal movement and are of greatest width adjacent the free end of the fingers, torsion springs bias the fingers radially outwardly, each collar half subtends an arc of less than 180° so that there are diametrically opposite axially-extending gaps between the two halves when they are secured in position surrounding a shaft, and the fingers are mounted in pairs with the free ends of each pair adjacent one of the gaps.

Other objects, features and advantages will appear from the following detailed description of a preferred embodiment of the invention, taken together with the attached drawings in which:

FIG. 1 is a perspective view of a collar assembly constructed in accordance with the present invention positioned in alignment with a hollow core;

FIG. 2 is a plan view, partially in section, of the collar assembly of FIG. 1 mounted on a shaft and engaging the end of a hollow core;

FIG. 3 is a sectional view taken at line 3—3 of FIG. 2;

FIG. 4 is a perspective view of a portion of the collar assembly of FIGS. 1-3; and, FIG. 5 is a sectional view taken at line 5—5 of FIG. 4.

Referring more particularly to the drawings, there is shown a collar assembly, generally designated 10, adapted for mounting on a shaft 12 and engaging the axial end 14 of a hollow core 16. Assembly 10 comprises a pair of identical collar halves, generally designated 18, 19, respectively secured to each other (and tightened around shaft 12) by six cap screws 17. Each collar half 18, 19 includes a body 20, 21 in the general form of a semi-cylinder having an outer surface 22 of radius slightly less than the radius of the inner surface 23 of core 16 (to provide a close slip fit between the two) and an inner coaxial surface 24 of radius equal to or slightly less than that of the outer periphery 25 of shaft 12. In practice, the radius of collar outer surface 22 is a nominal (within manufacturing tolerances) one sixty-fourth inch less than that of core inner surface 23, and manufacturing tolerances are adjusted so that the radius of collar inner surface 24 is not less than that of shaft outer surface 25.

As shown most clearly in FIG. 3, each collar half 18, 19 subtends an arc of slightly less than 180° so that, when the collar halves are mounted on a shaft, their axially extending edges 26 will be slightly spaced from each other rather than abutting. The diametrically opposed axial gaps 28 between adjacent edges 26 insure that the collar halves will tightly engage shaft 12, even if for some reason the effective radius of the shaft outer surface 25 is slightly less than that of the inner surfaces 24 of collar bodies 19, 21. In practice, the width of gaps 28 is about one-eighth inch.

Cap screws 17 are spaced along the length of each of halves 18, 19, adjacent edges 26. At the top (as shown) of the collar, three screws 17 extend from respective counterbores 32 in collar body 21 across the gap 28 between the top pair of edges 26 to threaded holes 34 in body 20; the other three screws 17 extend, at the collar bottom from counterbores 32 in collar body 20 across the gap 28 between the bottom pair of edges 26 to threaded holes 34 in body 21. As shown, the depth of each of counterbores 32 is such that the head of the cap screw 17 therein will lie radially within the periphery of body outer surface 22.

A chamfer 36 is provided at each axial end of such collar body 20, 21 to facilitate inserting collar 10 into and withdrawing it from core 16. An annular groove 38 of rectangular cross-section is provided in the outer surface 22 of each of collar bodies 21, 22, axially inwardly from the pair of cap screws 17 nearest the front end 40 of collar 10. Two spring biased fingers 41, 42 are mounted in the groove 38 of each collar halves 18, 19.

As shown most clearly in FIGS. 2 and 3, each of fingers 41, 42 is mounted on a cap screw 44 and bushing 46 for pivotal movement between a retracted position (shown at the tops of FIGS. 2 and 3) in which the finger lies wholly within its respective groove 38, and an expanded position (shown at the bottoms of FIGS. 2 and 3 and in FIG. 1) in which the finger projects radially beyond the outer surface 22 of the respective collar half. Each cap screw 44 extends, axially of collar 10, from a counterbore 48 in collar front end 40 across and into a threaded hole 50 in the far side of groove 38. Each bushing 46 is press-fitted into a pair of aligned bores 54 in axially spaced legs 56 at one end of a respective one of fingers 41, 42, and a cap screw 44 extends through and forms a slip-fit with the bushing 46. To bias each finger 41, 42 pivotally outwardly, a torsion spring 58 is wrapped around the portion of each bushing 46 in the space between legs 56. One end 60 of string 58 is fitted into a hole projecting generally circumferentially into finger 41, 42 between legs 56; the other end 62 bears against the base of groove 38.

As shown in FIGS. 1 and 3, the two fingers 41, 42 of each collar half 18, 19 are positioned with their fixed ends facing towards and about 45° from each other, and their free ends 73 facing and spaced slightly from a side 26. Thus, when the collar halves are assembled, one pair of fingers 41, 42 has its free ends 73 adjacent each of gaps 28, and the two pairs of finger free ends 73 are generally diametrically opposite each other so that all four projecting fingers 41, 42 may easily be manually engaged and pressed inwardly into grooves 38.

FIGS. 4 and 5 illustrate most clearly the configuration of fingers 41. Fingers 42 are mirror images of fingers 41 and, in FIGs. 1–3, corresponding portions of all four fingers 41, 42 are identified using the same reference numerals. As shown in FIGS. 4 and 5, and also in FIGS. 1–3, each finger 41, 42 comprises an arcuate member subtending an arc of about 65° and having an overall width and thickness slightly less than, respectively, the axial thickness and radial depth of groove 38. The radially inner surface 63 and radially outer surface 64 of each finger define parts of coaxial cylinders of radii, respectively, slightly more than that of the base of groove 38 and slightly less than that of collar outer surface 22. A portion of the outer surface 64 of each finger 41, 42 is removed to provide a sloped camming surface 66. Each camming surface 66 comprises a generally triangular section from the outer wall of a cylinder having a radius substantially equal to that of collar outer surface 22 and an axis forming an angle α of less than about 30° (as shown 21.6°) with the axis of collar outer surface 22, and also with finger outer surface 64. The arcuate leading edge 70 of each camming surface 66 has a radius substantially equal to that of collar outer surface 22. Each finger is mounted in groove 38 so that, when the finger is in its outwardly projecting extended position, the respective leading edge 70 of its camming surface 66 will be generally aligned in close juxtaposition with, and the edge 75 defined by its free end 73 and its inner surface 63 will be slightly radially within, outer surface 22. As will be noted, the greatest width of each camming surface 66 is adjacent the free end 73 of the respective finger 41, 42; the greatest length is adjacent the forward end surface 71 of the finger; and the surface slopes generally downwardly towards the corner formed by the free end 73 and forward end 71 of the finger.

The portion of each finger opposite free end 73 includes a rectangular cut-out providing finger legs 56 and the space therebetween in which spring 58 is mounted. Bores 54 are spaced 53° from free end 73, and portion of inner surface 63 on the side of bores 54 most distant from end 73 defines a bevel 68 extending the full width of the finger. As shown, bevel 68 is cut on a radius equal to that of the base of groove 38 and provides a stop surface engaging the base of groove 38 when the finger is in its extended position.

In operation, collar 10 placed on shaft 12 and tightly secured thereto by tightening cap screws 17. The shaft and collar are then inserted, front end 40 of the collar first, into one end of a hollow core 14. Chamfer 36 at the collar front end insures that the collar is initially centered in the core. As insertion continues, the end of the core (opposite end 14) engages camming surfaces 66 of fingers 41, 42 and forces them (against the bias of torsion springs 58) to pivot radially inwardly into grooves 38. When the collar has passed through core 16 to the position shown in FIG. 2, in which the rear 39 of groove 38 is aligned with end 14 of core 16, fingers 41, 42 snap outwardly into their extended position, bringing the rear end surfaces 74 of fingers 41, 42 into tight face-to-face engagement with core end 14. In this position, fingers 41, 42 prevent axial movement of core 16 in one direction relative to core 14, and the portion of collar outer surface 22 between groove 38 and rear end 11 of the collar provides radial support for the core.

Other embodiments will be within the scope of the following claims.

What is claimed is:

1. A stop assembly comprising:
   a body having an outer surface adapted for engaging the interior surface of a hollow core and arranged for mounting securely on a shaft;
   a plurality of fingers secured to said body for pivotal movement relative thereto about respective axes generally parallel to the axis of said outer surface between respective first positions in which said fingers lie within said outer surface and respective second positions in which said fingers project beyond said outer surface; and,
   means for biasing said fingers towards said second positions,
   each of said fingers defining a core engagement surface lying in a plane generally perpendicular to the axis of said outer surface and defining a camming surface facing generally away from and inclined relative to said core engagement surface thereof,
   said core engagement surfaces of all of said fingers being substantially coplanar and facing in the same direction, and
   no fixed portion of said assembly lying outwardly of said outer surface whereby said assembly may be inserted into a core having an interior surface not substantially larger than said outer surface.

2. The stop assembly of claim 1 wherein said body includes a plurality of body portions, each of said body portions defining a portion of said outer surface and having circumferentially spaced side edges extending generally parallel to the axis of said outer surface, adjacent side edges being spaced from each other when said assembly is mounted on said shaft.

3. The stop assembly of claim 2 wherein said body portions are substantially identical, and each of said body portions subtends an arc of less than 180°.

4. A stop assembly comprising:
a body having an outer surface adapted for engaging the interior surface of a hollow core and arranged for mounting securely on a shaft;
a plurality of fingers secured to said body for pivotal movement relative thereto about respective axes generally parallel to the axis of said outer surface between respective first positions in which said fingers lie within said outer surface and respective second positions in which said fingers project beyond said outer surface; and,
means for biasing said fingers towards said second positions,
said body including a plurality of substantially identical body portions each subtending an arc of less than 180°, defining a portion of said outer surface, including an annular groove in the outer surface thereof and having circumferentially spaced side edges extending generally parallel to the axis of said outer surface,
adjacent side edges of said body portion being spaced from each other when said assembly is mounted on said shaft,
each of said fingers defining a core engagement surface lying in a plane generally perpendicular to the axis of said outer surface and defining a camming surface facing generally away from and inclined relative to said core engagement surface thereof,
said core engagement surfaces of all of said fingers being substantially coplanar and facing in the same direction,
a pair of said fingers being mounted in each said groove with the free end of each of said pair being adjacent and the axis of pivotal movement of each of said pair being spaced from a respective one of said side edges of said each body portion, and
no fixed portion of said assembly lying outwardly of said outer surface whereby said assembly may be inserted into a core having an interior surface not substantially larger than said outer surface.

5. The stop assembly of claim 1 wherein each of said fingers is mounted for pivotal movement about an axis adjacent one end thereof and, in said extended position, the edge of each said finger defined by the opposite end thereof and the radially inner surface thereof is slightly radially inward of said outer surface.

6. The stop assembly of claim 1 wherein each of said camming surfaces is generally triangular and of greater width adjacent the free end of a respective said finger than at a point spaced from said free end toward said axis of movement thereof.

7. The stop assembly of claim 6 wherein each of said camming surfaces is inclined at an angle of not more than 30° to the axis of said outer surface.

8. The stop assembly of claim 7 wherein said angle is about 20°.

9. The stop assembly of claim 6 wherein said outer surface is generally cylindrical and each of said camming surfaces defines a portion of a cylindrical surface of diameter not greater than the diameter of said outer surface.

10. The stop assembly of claim 1 wherein said outer surface is generally cylindrical and the edge of each said finger defined by said camming surface thereof and by an axially-facing edge surface thereof defines a portion of a circle or radius substantially equal to that of said outer surface and in substantial alignment with said outer surface when said each finger is in its extended position.

11. The stop assembly of claim 1 including four said fingers arranged in two pairs with the free ends of the fingers of each pair facing and adjacent each other.

12. The stop assembly of claim 1 wherein said outer surface is generally cylindrical and said body has a generally cylindrical inner surface arranged for tightly engaging the outer periphery of a cylindrical shaft, and in combination with a said shaft having an outer periphery of diameter substantially equal to but not greater than the diameter of said inner surface and with a core having an inner cylindrical surface of diameter substantially equal to the diameter of said assembly outer surface and an axially-facing end surface engaging said stop surfaces of said fingers.

13. A stop assembly comprising:
a body arranged for mounting securely on a shaft and having an outer surface adapted for engaging the interior surface of a hollow core and an annular groove in said outer surface;
a plurality of fingers mounted in said groove and secured to said body for pivotal movement relative thereto about respective axes generally parallel to the axis of said outer surface between respective first positions in which said fingers lie within said outer surface and respective second positions in which said fingers project beyond said outer surface; and,
means for biasing said fingers towards said second positions,
each of said fingers defining a core engagement surface lying in a plane generally perpendicular to the axis of said outer surface and defining a camming surface facing generally away from and inclined relative to said core engagement surface thereof,
said core engagement surfaces of all of said fingers being substantially coplanar and facing in the same direction,
said fingers being arranged in a plurality of pairs with the free end of each finger of one of said pairs being adjacent and facing the free end of a finger of another of said pairs, and
no fixed portion of said assembly lying outwardly of said outer surface whereby said assembly may be inserted into a core having an interior surface not substantially larger than said outer surface.

14. The assembly of claim 1 wherein said fingers are spring biased towards said second positions.

* * * * *

UNITED STATES PATENT AND TRADEMARK OFFICE
CERTIFICATE OF CORRECTION

PATENT NO. : 4,073,497
DATED : February 14, 1978
INVENTOR(S) : Richard Edward Flagg and Blaine Potter It is certified that error appears in the above-identified patent and that said Letters Patent are hereby corrected as shown below:

Title: CARE CHUCK STOP ASSEMBLY should be --CORE CHUCK STOP ASSEMBLY--.

Column 1, line 1, "CARE" should be --CORE--.

Signed and Sealed this

Twenty-seventh Day of June 1978

[SEAL]

Attest:

RUTH C. MASON
Attesting Officer

DONALD W. BANNER
Commissioner of Patents and Trademarks